United States Patent
Lakshmi Narayanan et al.

(10) Patent No.: US 10,425,979 B2
(45) Date of Patent: Sep. 24, 2019

(54) METHOD, APPARATUS, CELLULAR NETWORK BASE STATION AND COMPUTER PROGRAM TO ENABLE REMOTE MAINTENANCE

(71) Applicant: NOKIA SOLUTIONS AND NETWORKS OY, Espoo (FI)

(72) Inventors: Ram Lakshmi Narayanan, Pleasanton, CA (US); Somasundaram Velayutham, Sunnyvale, CA (US)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 15/322,262

(22) PCT Filed: Jun. 25, 2014

(86) PCT No.: PCT/EP2014/063390
§ 371 (c)(1),
(2) Date: Dec. 27, 2016

(87) PCT Pub. No.: WO2015/197117
PCT Pub. Date: Dec. 30, 2015

(65) Prior Publication Data
US 2017/0156169 A1   Jun. 1, 2017

(51) Int. Cl.
H04W 76/14 (2018.01)
H04W 24/04 (2009.01)
H04W 76/30 (2018.01)
H04L 12/24 (2006.01)
H04W 8/22 (2009.01)
H04W 12/08 (2009.01)
H04W 92/18 (2009.01)

(52) U.S. Cl.
CPC ......... H04W 76/14 (2018.02); H04L 41/0631 (2013.01); H04W 8/22 (2013.01);
(Continued)

(58) Field of Classification Search
CPC ... H04W 76/14; H04W 76/30; H04W 76/023; H04W 12/08; H04W 8/22; H04W 76/06; H04W 92/18; H04L 41/0631
See application file for complete search history.

(56) References Cited

U.S. PATENT DOCUMENTS

2006/0062206 A1* 3/2006 Krishnaswamy ... H04L 12/2856
370/352
2011/0084804 A1   4/2011 Khorashadi et al.
(Continued)

FOREIGN PATENT DOCUMENTS

CN   102 740 337 A   10/2012
EP   1 280 296 A1    1/2003
(Continued)

OTHER PUBLICATIONS

Translation of CN102740337, Google Translate, Oct. 2012 (Year: 2012).*
(Continued)

Primary Examiner — Afshawn M Towfighi
(74) Attorney, Agent, or Firm — Squire Patton Boggs (US) LLP

(57) ABSTRACT

According to one aspect of the invention there is provided an apparatus including at least one processor configured to detect a failure with a first cellular network base station; and establish an out of band communication channel with the first cellular network base station via a second cellular network base station being adjacent to the first cellular network base station to enable remote maintenance of the first cellular network base via the established out of band communication channel.

30 Claims, 5 Drawing Sheets

(52) U.S. Cl.
CPC .......... *H04W 12/08* (2013.01); *H04W 24/04* (2013.01); *H04W 76/30* (2018.02); *H04W 92/18* (2013.01)

(56) References Cited

U.S. PATENT DOCUMENTS

| | | | |
|---|---|---|---|
| 2012/0170559 A1* | 7/2012 | Feinberg | H04L 63/18 370/338 |
| 2013/0083779 A1 | 4/2013 | Ahn et al. | |
| 2014/0148179 A1* | 5/2014 | Das | H04B 1/7107 455/452.1 |

FOREIGN PATENT DOCUMENTS

| | | |
|---|---|---|
| EP | 2 254 365 A2 | 11/2010 |
| WO | WO 2012/105881 A1 | 8/2012 |
| WO | 2012/139360 A1 | 10/2012 |

OTHER PUBLICATIONS

3GPP TR 22.803 V12.2.0 (Jun. 2013); 3rd Generation Partnership Project; Technical Specification Group Services and System Aspects; Feasibility study for Proximity Services (ProSe) (Release 12).
3GPP TS 22468 V0.3.0 (Feb. 2013); 3rd Generation Partnership Project; Technical Specification Group Services and System Aspects; Group Communication System Enablers for LTE; (GCSE_LTE) Release 12.
International Search Report and Written Opinion dated Sep. 1, 2014 corresponding to International Patent Application No. PCT/EP2014/063390.
3GPP TS 22468 V12.0.0 (Jun. 2013), 3rd Generation Partnership Project; Technical Specification Group Services and System Aspects; Group Communication System Enablers for LTE (GCSE_LTE) (Release 12), 22 pages.
Chinese Office Action corresponding to Application No. 201480081485.X, dated Jun. 25, 2019.

* cited by examiner

METHOD, APPARATUS, CELLULAR NETWORK BASE STATION AND COMPUTER PROGRAM TO ENABLE REMOTE MAINTENANCE

FIELD OF THE INVENTION

The invention relates to wireless communication networks. Especially, the invention relates to enable remote maintenance of a cellular network element.

BACKGROUND OF THE INVENTION

Wireless communication networks, for example, cellular communication networks, must be kept operational for periodic and non-periodic temporary failures. From an operator's perspective, the goal is to minimize site downtime and increase operational efficiency. Although network elements of a wireless communication network are tested thoroughly at times they may go down (i.e. become non-operational).

Certain class or classes of problems may be solved via remote maintenance. If the non-operational network element is, for example, a cellular network base station, the remote maintenance operation will work only when the cellular network base station software is up and, connectivity to the cellular network base station via a remote link is possible. The remote maintenance operations, however, may not be possible if the cellular network base station stops responding to remote commands or software is not able to come up and establish a connection with the remote maintenance site. If no remote connection can be established, the only option may be to send a field engineer for troubleshooting onsite. Further, during software upgrade, flash ROM (Read Only Memory) corruption etc., basic file corruption inside the cellular network base station may not be resolvable via remote maintenance and may thus require on site troubleshooting. Sending the field technician to onsite inspection is time consuming and expensive.

Sometimes remote maintenance may be possible if there is a dedicated line for this purpose, for example, to a cellular network base station. In practice it may be difficult and expensive to arrange a dedicated line due to the distance from the remote maintenance site to the cellular network base station. Further, sometimes remote maintenance would be possible if there was a remote maintenance connection to the cellular network base stations. But, as disclosed already above, the problem with the cellular network base station may be such that it is not able to establish a connection with the remote maintenance site.

Based on the above, there is a need for a solution which would allow more flexible remote monitoring and troubleshooting capabilities of cellular network elements.

SUMMARY

According to one aspect of the invention, there is provided an apparatus including at least one processor configured to: detect a failure with a first cellular network base station; and establish an out of band communication channel with the first cellular network base station via a second cellular network base station being adjacent to the first cellular network base station to enable remote maintenance of the first cellular network base via the established out of band communication channel.

In one example, the apparatus is further configured to provide the second cellular network base station with security credentials to establish the out of band communication channel with the first cellular network base station; and instruct the second cellular network base station to tune-in to a specific frequency of the first cellular network base station and to supply the security credentials to the first cellular network base station to establish the out of band communication channel.

In one example, the apparatus is further configured to establish the out of band communication channel with the first cellular network base station via the second cellular network base station being adjacent to the first cellular network base station and a mobile communication device capable of out of band communication with the first cellular network base station and the second cellular network base station.

In one example, the apparatus is further configured to select the mobile communication device from a set of mobile communication devices being able to communicate with the first cellular network base station and one or more cellular network base stations being adjacent to the first cellular network base station.

In one example, the apparatus is further configured to request, from a location server, a set of mobile communication devices being able to communicate with the first cellular network base station and one or more cellular network base stations adjacent to the first cellular network base station.

In one example, the apparatus is further configured to determine, before selecting the mobile communication device, that the mobile communication device enables establishment of an out of band communication channel via the mobile communication device. The apparatus may verify the user profile of each mobile communication device, and their willingness to participate in the activity.

In one example, the apparatus is further configured to determine that a parameter relating to the mobile communication device is not acceptable; and to select a new mobile communication device to establish the out of band communication channel again.

In one example, the apparatus is further configured to provide security credentials to be used by the mobile communication device to the second cellular network base station device when establishing the out of band communication channel.

In one example, the apparatus is further configured to detect the failure based on a missing message from the first cellular network base station.

In one example, the apparatus is further configured to execute remote maintenance operations of the first cellular network base station via the established out of band communication channel.

In one example, the apparatus is further configured to instruct the first cellular network base station and the mobile communication device to terminate the out of band communication channel and to switch back to normal operation mode.

In one example, the apparatus is further configured to the out of band communication includes device to device communication.

In one example, the out of band communication includes device to device communication of the long-term evolution technology.

According to another aspect of the invention, there is provided a method including detecting a failure with a first cellular network base station; and establishing an out of band communication channel with the first cellular network base station via a second cellular network base station being adjacent to the first cellular network base station to enable remote maintenance of the first cellular network base via the established out of band communication channel.

In one example, the method further includes providing the second cellular network base station with security credentials to establish the out of band communication channel with the first cellular network base station; and instructing the second cellular network base station to tune-in to a specific frequency of the first cellular network base station and to supply the security credentials to the first cellular network base station to establish the out of band communication channel.

In one example, the method further includes establishing the out of band communication channel with the first cellular network base station via the second cellular network base station being adjacent to the first cellular network base station and a mobile communication device capable of out of band communication with the first cellular network base station and the second cellular network base station.

In one example, the method further includes selecting the mobile communication device from a set of mobile communication devices being able to communicate with the first cellular network base station and one or more cellular network base stations being adjacent to the first cellular network base station.

In one example, the method further includes requesting, from a location server, a set of mobile communication devices being able to communicate with the first cellular network base station and one or more cellular network base stations adjacent to the first cellular network base station.

In one example, the method further includes determining, before selecting the mobile communication device, that the mobile communication device enables establishment of an out of band communication channel via the mobile communication device.

In one example, the method further includes determining that a parameter relating to the mobile communication device is not acceptable; and selecting a new mobile communication device to establish the out of band communication channel again.

In one example, the method further includes providing security credentials to be used by the mobile communication device to the second cellular network base station device when establishing the out of band communication channel.

In one example, the method further includes detecting the failure based on a missing message from the first cellular network base station.

In one example, the method further includes executing remote maintenance operations with the first cellular network base station via the established out of band communication channel.

In one example, the method further includes instructing the first cellular network base station and the mobile communication device to terminate the out of band communication channel and to switch back to normal operation mode.

In one example, the out of band communication includes device to device communication.

In one example, the out of band communication includes device to device communication of the long-term evolution technology.

According to another aspect of the invention, there is provided a computer program including code for detecting a failure with a first cellular network base station; and code for establishing an out of band communication channel with the first cellular network base station via a second cellular network base station being adjacent to the first cellular network base station to enable remote maintenance of the first cellular network base via the established out of band communication channel.

In one example, the computer program is a computer program product including a computer-readable medium bearing computer program code embodied therein for use with a computer.

According to another aspect of the invention, there is provided an apparatus including a base station radio module; an out of band communication radio module, wherein hardware and software of the base station radio module and the out of band communication radio module are separated such that the base station radio module and the out of band communication radio module are able to boot and function independently; a boot sequence control module configured to initiate booting of the out of band communication module first, and after the out of band communication module has booted, to initiate booting of the base station radio module; and a security control module configured to manage remote access to the cellular network base station via the out of band communication radio module. The apparatus is, for example, a cellular network base station.

In one example, the security control module is configured to receive security credentials from a mobile communication device to establish an out of band communication channel with the mobile communication device and to verify the received security credentials; and the out of band communication radio module is configured to establish the out of band communication channel with the mobile communication device when the of the verification is positive.

In one example, the security control module is configured to receive security credentials from a cellular network base station to establish an out of band communication channel with cellular network base station and to verify the received security credentials; and the out of band communication radio module is configured to establish the out of band communication channel with the cellular network base station when the outcome of the verification is positive.

In one example, the security control module is configured to receive security credentials from a remote apparatus to establish an out of band communication channel with a cellular network base station and to verify the received security credentials; and the out of band communication radio module is configured to establish the out of band communication channel with the cellular network base station when the outcome of the verification is positive.

In one example, the security control module is configured to receive security credentials from a remote apparatus to establish an out of band communication channel with a cellular network base station via a mobile communication device and to verify the received security credentials; and the out of band communication radio module is configured to establish the out of band communication channel with the cellular network base station via the mobile communication device when the outcome of the verification is positive.

In one example, the out of band communication radio module includes a device to device communication radio module.

In one example, the out of band communication radio module includes long term evolution device to device communication radio module.

According to another aspect of the invention, there is provided a method including receiving, with an out of band communication radio module of an apparatus security credentials from a network element to establish an out of band communication channel with the network element; verifying, with the out of band communication radio module, the received security credentials; and establishing, with the out of band communication radio module, the out of band communication channel with the network element when the outcome of the verification is positive. The apparatus is, for example, a cellular network base station.

In one example, the network element is a cellular network base station.

In one example, the network element is a mobile communication device.

According to another aspect of the invention, there is provided a computer program including code for receiving, with an out of band communication radio module of an apparatus, security credentials from a network element to establish an out of band communication channel with the network element; code for verifying, with the out of band communication radio module, the received security credentials; and code for establishing, with the out of band communication radio module, the out of band communication channel with the network element when the outcome of the verification is positive. The computer program may be a computer program product including a computer-readable medium bearing computer program code embodied therein for use with a computer.

According to another aspect of the invention, there is provided a method including: receiving, with an out of band communication radio module of an apparatus, security credentials from a remote apparatus to establish an out of band communication channel with a cellular network base station; verifying, with the out of band communication radio module, the received security credentials; and establishing, with the out of band communication radio module, the out of band communication channel with the cellular network base station when the outcome of the verification is positive.

According to another aspect of the invention, there is provided a computer program including code for receiving, with an out of band communication radio module of an apparatus, security credentials from a remote apparatus to establish an out of band communication channel with a cellular network base station; code for verifying, with the out of band communication radio module, the received security credentials; and code for establishing, with the out of band communication radio module, the out of band communication channel with the cellular network base station when the outcome of the verification is positive.

According to another aspect of the invention, there is provided a method including: receiving, with an out of band communication radio module of an apparatus, security credentials from a remote apparatus to establish an out of band communication channel with a cellular network base station via a mobile communication device; verifying, with the out of band communication radio module, the received security credentials; and establishing, with the out of band communication radio module, the out of band communication channel with the cellular network base station via the mobile communication device when the outcome of the verification is positive.

According to another aspect of the invention, there is provided a computer program including code for receiving, with an out of band communication radio module of an apparatus, security credentials from a remote apparatus to establish an out of band communication channel with a cellular network base station via a mobile communication device; code verifying, with the out of band communication radio module, the received security credentials; and code for establishing, with the out of band communication radio module, the out of band communication channel with the cellular network base station via the mobile communication device when the outcome of the verification is positive According to another aspect of the invention, there is provided an apparatus including means for detecting a failure with a first cellular network base station; and means for establishing an out of band communication channel with the first cellular network base station via a second cellular network base station being adjacent to the first cellular network base station to enable remote maintenance of the first cellular network base via the established out of band communication channel.

According to another aspect of the invention, there is provided an apparatus including base station radio means; out of band communication radio means; wherein hardware and software of the base station radio means and the out of band communication radio means are separated such that the base station radio means and the out of band communication radio means are able to boot and function independently; boot sequence control means configured to initiate booting of the out of band communication means first, and after the out of band communication means has booted, to initiate booting of the base station radio means; and a security control means configured to manage remote access to the cellular network base station via the out of band communication radio means. The apparatus is, for example, a cellular network base station.

According to another aspect of the invention, there is provided a system comprising a first cellular base station; a second cellular base station; and an apparatus including at least one processor configured to detect a failure with the first cellular network base station; and to establish an out of band communication channel with the first cellular network base station via the second cellular network base station being adjacent to the first cellular network base station to enable remote maintenance of the first cellular network base via the established out of band communication channel.

In one example, the apparatus is configured to establish the out of band communication channel with the first cellular network base station via the second cellular network base station being adjacent to the first cellular network base station and a mobile communication device capable of out of band communication with the first cellular network base station and the second cellular network base station.

BRIEF DESCRIPTION OF THE DRAWINGS

The accompanying drawings, which are included to provide a further understanding of the invention and constitute a part of this specification, illustrate example embodiments of the invention and together with the description help to explain the principles of the invention. In the drawings.

DETAILED DESCRIPTION

In the following, the invention is illustrated at least partly using examples implemented in a cellular communications network utilizing long-term evolution (LTE) based technology. However, it is to be understood that these examples are non-limiting and that example embodiments of the invention may be implemented in any cellular communications network in which base stations and mobile communication devices are able communicate out of band. A network may use in-band and out-of-band communications. In in-band communication, information such as for example and not limited to user, user communication traffic and/or state information, is typically communicated over a physical link, channel, or other communication technique beyond and not limited to 3GPP standards. (Examples of state information include and are not limited to control, management and crowd sourcing information.) In out-of-band communication, any of the user, user communication traffic and state information is communicated separately over a different physical link, channel, or other communications technique beyond and not limited 3GPP standards. Furthermore, it is to be understood that the term long-term evolution, as used herein, is intended to cover its various variations, such as LTE Advanced, LTE-A.

The invention utilizes a technology called device to device (D2D) communication. Typically, the D2D communication functions as an underlay to a cellular network, operating on the same resources. Besides cellular operation, where user equipment (UE) is served by the network via the base stations, called evolved Node Bs (eNBs) in the LTE architecture, UE units may communicate directly with each other over the D2D links. D2D communication is also known as proximity services (ProSe) communication.

Figure 1:
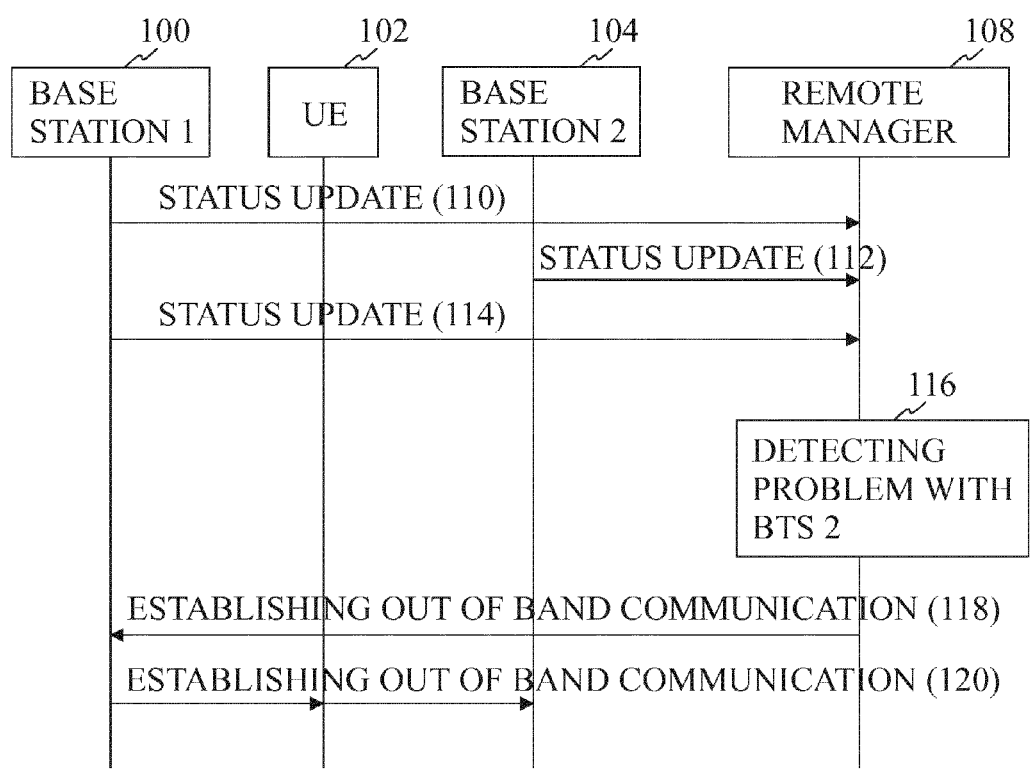
FIG. 1 is a communication flow diagram illustrating a method according to one example of the invention.

FIG. 1 is a communication flow diagram illustrating a method device according to one example of the invention. The example disclosed in FIG. 1 includes two cellular network base stations 100, 104, a mobile communication device 102 and a remote manager 108. The remote manager 108 is aware of the statuses of the cellular network base stations 100, 104. In this example, the cellular network base stations 100, 104 send to the remote manager 108 periodic status updates 110, 112, 114 based on which the remote manager 108 is able to determine whether the base stations are operational or not. The remote manager 108 refers, for example, to a remote server that is able to provide remote maintenance via a communication channel.

In the example of FIG. 1, the remote manager 108 fails to receive from the cellular network base station 104 a new periodic status update after the previous status update. Thus, the remote manager is able to determine that there is a problem with the cellular network base station 104. The remote manager 108 may have also other remote maintenance links towards the cellular network base station 104. This example assumes that these links cannot be used to recover from the problem situation.

The remote manager 108 establishes (at 118, 120) an out of band communication channel with the cellular network base station 104 via the cellular network base station 100 being adjacent to the cellular network base station 104 and via a mobile communication device 102 capable of out of band communication with the cellular network base stations 100, 104.

In the example disclosed in FIG. 1, the out of band communication refers to a communication mode which is separate from the normal operation mode.

Figure 2:
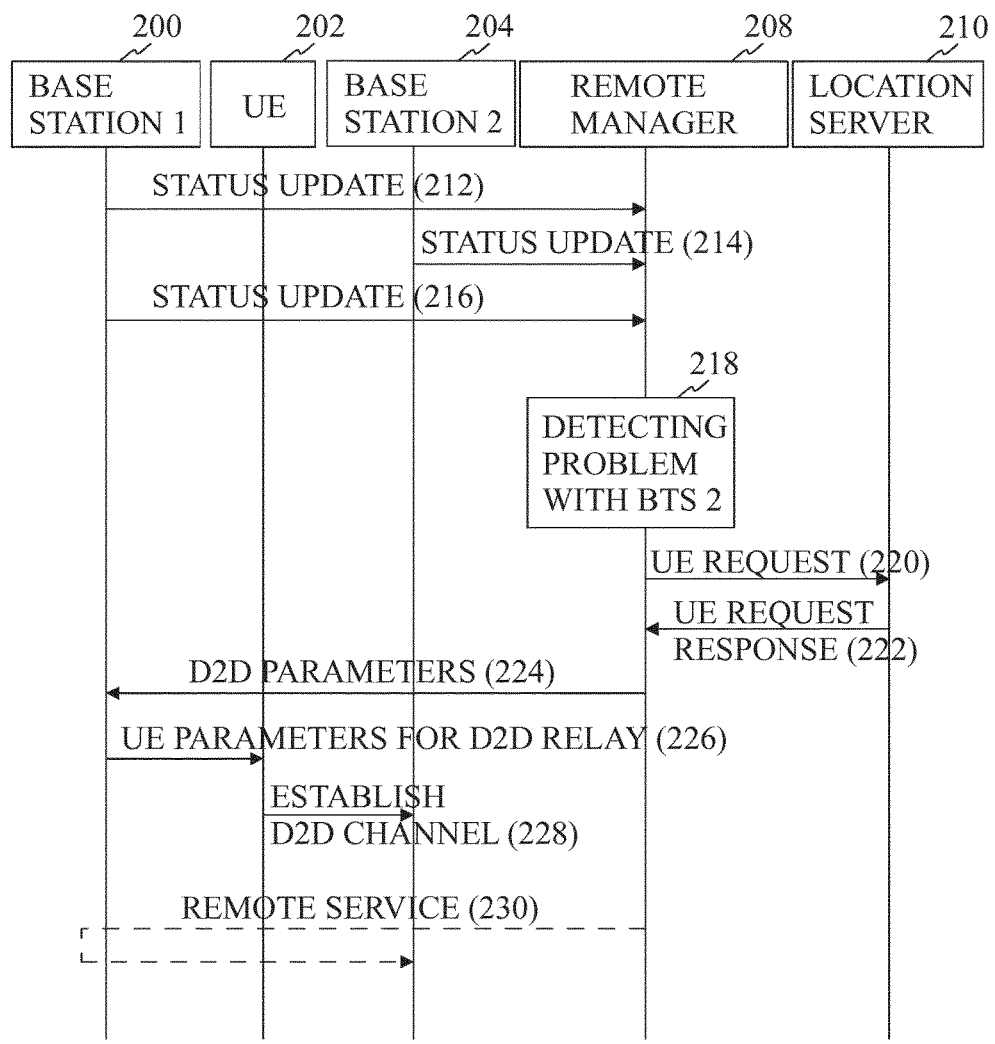
FIG. 2 is a communication flow diagram illustrating a method according to another example of the invention.

FIG. 2 is a communication flow diagram illustrating a method according to another example of the invention. The example disclosed in FIG. 2 includes two cellular network base stations 200, 204, a mobile communication device 202, a remote manager 208 and a location server 210. The mobile communication device 202 is, for example, user equipment (UE).

Under normal operation, the cellular network base stations 200, 204 provide various pieces of information relating, for example, to their status (messages 212, 214, 216), health of the site, and statistics related to the operation such as counters and alarm statistics periodically to the remote manager 208, for example to an operation, administration and management (O&AM) system or other maintenance entity.

FIG. 2 illustrates a situation where the cellular network base station 204 is not operational due to some problems. The remote manager 208 will not receive the expected periodic network status from the cellular network base station 204. Although FIG. 2 discloses that the failure is detected based on a missing periodic status update message, the failure can be detected based on other pointers. For example, the remote manager 208 may try to send some queries to the cellular network base station 204 to see whether it gets any response from the cellular network base station 204. A service engineer at a network operation center may start automatic remote diagnostics to try to solve the problem. In the example disclosed in FIG. 2 all traditional remote diagnostics fail and the cellular network base station 204 remains non-functional or non-responsive. Thus, the remote manager 208 determines that there is a problem with the cellular network base station 204 (block 218). Traditionally this problem is solvable only by making an onsite visit by a service technician.

The remote manager 208 would like to establish a communication channel with the cellular network base station 204 in order to solve the problem remotely. However, there is no direct way to establish the session. It is, however, possible to establish the communication channel via another cellular network base station 200 and the mobile communication device 202. The remote manager 208 sends a request 220 to the location server 210 to receive a list of mobile communication devices which are available sufficiently close to the cellular network base station 204 and simultaneously sufficiently close to the cellular network base station 200 or other neighboring cellular network base stations. In one example, the request may include the geographical location of the faulty cellular network base station 204. Based on the geographical location the location server 210 is able to construct a list of potential mobile communication devices and cellular network base stations to the remote manager 208. At 222 the location server 210 supplies the remote manager 208 with the list including at least one mobile communication device and one cellular network base station. Yet in another example the remote manager 208 itself may have the information available about the locations of various cellular network base stations and mobile communication device close to the faulty cellular network base station 204. Thus, it may be able to determine the cellular network base station 200 and the mobile communication device without sending a request 220 to the location server 210.

The remote manager 208 may check from a profile relating to each mobile communication device whether proximity service, such as D2D type of service, is opted by the devices. If yes, these devices can be used in remote maintenance operations.

The remote manager 208 may select a mobile communication device (the mobile communication device 202 in FIG. 2) that is able to communicate with the cellular network base station 204 and a cellular network base station (the cellular network base station 200 in FIG. 2) that is able to communicate with the selected mobile communication device. The selected cellular base station 200 is, for example, a cellular network base station adjacent to the cellular network base station 204. However, the selected cellular base station 200 may not be the closest base station to the cellular network base station 204. Similarly, the selected mobile communication device may not be the closest mobile communication device station to the cellular network base station 204 or to the cellular network base station 200. The parameters affecting to the selection process may include, for example, distance between the network elements (i.e. the mobile communication device and the cellular network base stations), signal strength between the mobile communication device and the cellular network base station, traffic situation within the cellular network base station cell etc., or any combination of these parameters.

The remote manager 208 chooses appropriate D2D parameters for establishing a communication channel with the faulty cellular network base station 204 and provides the cellular network base station 200 with the D2D parameters, at 224. Each cellular base station has their own D2D parameters, for example, security credentials, frequency of operations, etc. When the cellular network base station 204 becomes faulty, only the remote manager 208 knows how to reach the D2D interface of the cellular network base station 204 and is able to have communication with the cellular network base station 204. The remote manager 208 will pass the necessary credentials and/or other parameters to the cellular network base station 200. The remote manager 208 will also pass specific D2D parameters for the mobile communication device 202 to be used to reach the faulty cellular network base station 204.

The cellular network base station 200 engages with the mobile communication device 202 and may learn some auxiliary information about the device, such as battery power level status, and ensures that the mobile communication device 202 has sufficient power level. If the power level of the mobile communication device 202 is too low, the remote manager 208 may choose a new mobile communication device. If the power level is acceptable, the cellular network base station 200 provides the mobile communication device 202 with parameter data for D2D relay operation (at 226). It is evident that battery level status is only one example of possible parameter data that may be used to determine whether the mobile communication device may still be used. Other parameters may include location, time etc. These are configured in D2D profiles of each mobile communication device along with their preferences.

In response to the D2D parameters, the mobile communication device 202 switches to D2D mode and acts as a D2D relay.

At 228, the mobile communication device 202 establishes a D2D channel with the cellular network base station 204 and the remote manager 208 may perform remote service operations via the established D2D channel (at 230).

As a summary of the above, the remote manager 208 requests the mobile communication device 202 (via the cellular network base station 200) to tune-in to a specific frequency of the faulty cellular network base station 204 and to supply necessary credentials to the cellular network base station 204 to establish communication with the mobile communication device 202. The D2D parameters used with the cellular network base station 200, the mobile communication device 202 and the cellular network base station 204 may be valid only for this single session. After each successful completion of troubleshooting or maintenance activity, the remote manager 208 may change the D2D parameters.

After successful establishment of the D2D channel via the cellular network base station 200 and the mobile communication device 202, a service technician may diagnose and troubleshoot the problem with the cellular network base station 204. If the remote operations are successful, the cellular network base station 204 resumes to its normal operation mode and starts sending status update messages to the remote manager 208.

After performing the remote operations, the remote manager may instruct both the cellular network base station 200 and the mobile communication device 202 to terminate the D2D channel and switch back to normal operation mode. In another example, the cellular network base station 204 may send a message to the mobile communication device 202 to terminate the D2D relay mode and switch to back normal operation mode.

In a further example of FIG. 2 the cellular network base station 204 is working but a site router or switch or backhaul that connects the cellular network base station 204 to a core network is faulty. The above disclosed mechanism can be used to remotely access also the site router or switch.

Since it is possible to establish an out of band communication channel (a D2D channel in the FIG. 2 example) via an adjacent cellular network base station 200 and the mobile communication device 202, the remote manager may be able to solve the problem with the cellular network base station 204 remotely thus eliminating the need of a service technician to make an onsite visit. This also provides significant cost savings.

Figure 3:
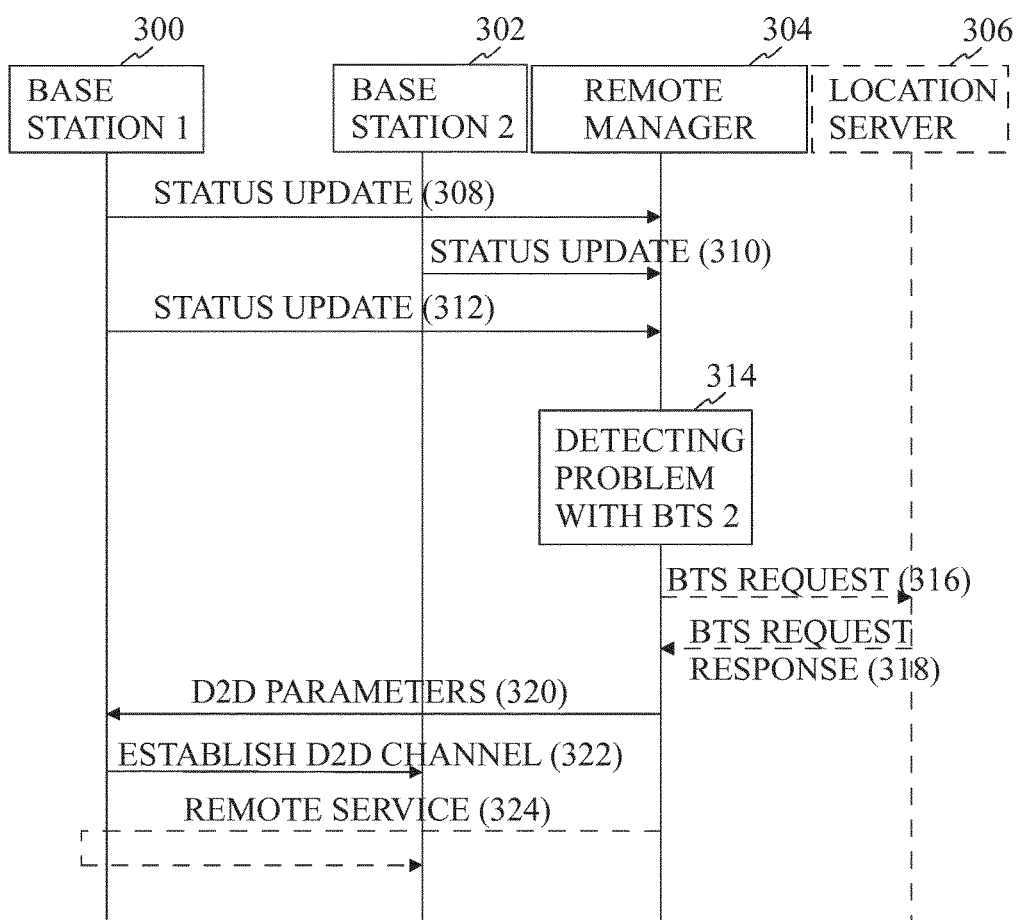
FIG. 3 is a communication flow diagram illustrating a method according to another example of the invention.

FIG. 3 is a communication flow diagram illustrating a method according to another example of the invention. The example disclosed in FIG. 3 includes two cellular network base stations 300, 302 and a remote manager 304.

Under normal operation, the cellular network base stations 300, 302 provide various pieces of information relating, for example, to their status (messages 308, 310, 312), health of the site, and statistics related to the operation such as counters and alarm statistics periodically to the remote manager 304, for example to an operation, administration and management (O&AM) system or other maintenance entity.

FIG. 3 illustrates a situation where the cellular network base station 302 is not operational due to some problems. The remote manager 304 will not receive the expected periodic network status from the cellular network base station 302. Although FIG. 3 discloses that the failure is detected based on a missing periodic status update message, the failure can be detected based on other pointers. For example, the remote manager 304 may try to send some queries to the cellular network base station 302 to see whether it gets any response from the cellular network base station 302. A service engineer at a network operation center may start automatic remote diagnostics to try to solve the problem. In the example disclosed in FIG. 3 all traditional remote diagnostics fail and the cellular network base station 302 remains non-functional or non-responsive. Thus, the remote manager 304 determines that there is a problem with the cellular network base station 302 (block 314). Traditionally this problem is solvable only by making an onsite visit by a service technician.

The remote manager 304 would like to establish a communication channel with the cellular network base station 302 in order to solve the problem remotely. However, there is no direct way to establish the session. It is, however, possible to establish the communication channel via another cellular network base station 300. The remote manager 304 may send a request 316 to a location server 306 to receive a list of cellular network base stations which are sufficiently close to the faulty cellular network base station 302. In one example, the request may include the geographical location of the faulty cellular network base station 302. Based on the geographical location the location server 306 is able to construct a list of potential cellular network base stations to the remote manager 304. At 318 the location server 306 supplies the remote manager 306 with the list including at least one cellular network base station.

The dashed lines in references 306, 316 and 318 indicate that they are optional elements. In another example, the remote manager 304 itself has the information available about the locations of various cellular network base stations close to the faulty cellular network base station 302. Thus, it may be able to determine the cellular network base station 300 without sending a request 316 to the location server 306.

The remote manager 304 may select a cellular base station that is adjacent to the cellular network base station 302. However, the selected cellular base station 300 may not be the closest base station to the cellular network base station 302. The parameters affecting to the selection process may include, for example, distance between the cellular network base stations, signal strength between the cellular network base stations, traffic situation within the cellular network base station cells etc., or any combination of these parameters.

The remote manager 320 chooses appropriate D2D parameters for establishing a communication channel with the faulty cellular network base station 302 and provides the cellular network base station 300 with the D2D parameters, at 320. Each cellular base station has their own D2D parameters, for example, security credentials, frequency of operations, etc. When the cellular network base station 302 becomes faulty, only the remote manager 304 knows how to reach the D2D interface of the cellular network base station and is able to have communication with the cellular network base station 302. The remote manager 304 will pass the necessary security credentials and/or other parameters to the cellular network base station 300 (at 320) and requests the cellular network base station 300 D2D interface to tune-in to a specified frequency of the faulty cellular network base station 302 and to supply the security credentials to the cellular network base station 302 to establish communication channel with the cellular network base station 300, at 322.

As a summary of the above, the remote manager 304 requests the cellular network base station 300 to tune-in to a specific frequency of the faulty cellular network base station 302 and to supply necessary credentials to the cellular network base station 302 to establish communication. In this example, certain frequencies can be used for D2D mode to cover larger distance, and thus the cellular network base station 300 is able to connect directly to the cellular network base station 302 without any additional mobile communication devices. The D2D parameters used with the cellular network base station 300 and the cellular network base station 302 may be valid only for this single session. After each successful completion of troubleshooting or maintenance activity, the remote manager 304 may change the D2D parameters.

After successful establishment of the D2D channel via the cellular network base station 300, a service technician may diagnose and troubleshoot the problem with the cellular network base station 302, at 324. If the remote operations are successful, the cellular network base station 302 resumes to its normal operation mode and starts sending status update messages to the remote manager 304.

After performing the remote operations, the remote manager 304 may instruct both the cellular network base station 300 to terminate the D2D channel and switch back to normal operation mode.

In a further example of FIG. 3 the cellular network base station 304 is working but a site router or switch or backhaul that connects the cellular network base station 304 to a core network is faulty. The above disclosed mechanism can be used to remotely access also the site router or switch.

Since it is possible to establish an out of band communication channel (a D2D channel in the FIG. 3 example) via an adjacent cellular network base station 300, the remote manager 304 may be able to solve the problem with the cellular network base station 302 remotely thus eliminating the need of a service technician to make an onsite visit. This also provides significant cost savings.

Figure 4:
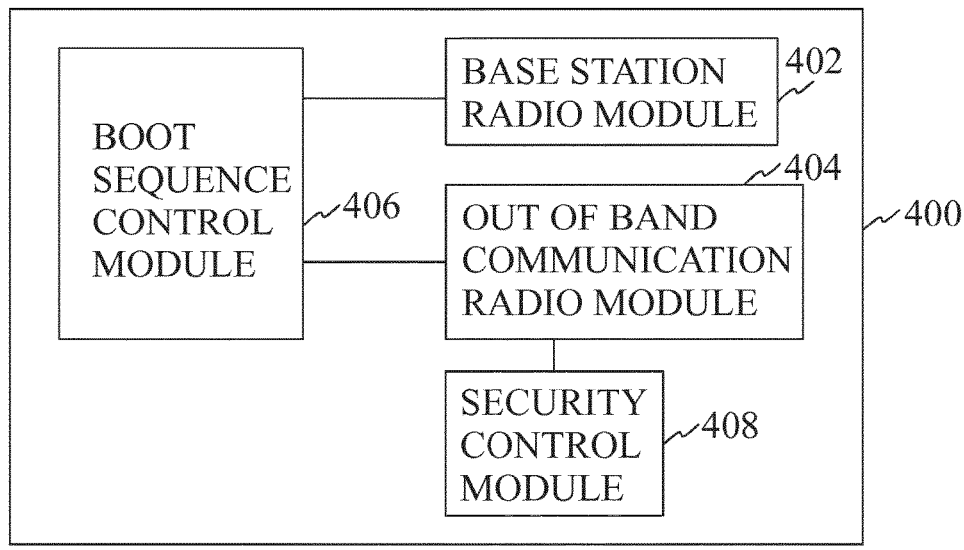
FIG. 4 is a block diagram illustrating modules at a cellular network base station according to one example of the invention.

FIG. 4 is a block diagram illustrating modules at a cellular network base station 400 according to one example of the invention. The example disclosed in FIG. 4 illustrates only some elements of the cellular network base station, and therefore, the cellular network base station may include also other elements and functional entities not disclosed in FIG. 4.

The cellular network base station 400 includes a base station radio module 402 and an out of band communication radio module 404. The out of band communication radio module refers, for example, to LTE D2D radio module, i.e. LTE Radio Management (LRM) module. The hardware and software of the base station radio module 402 and the out of band communication radio module 404 are separated such that the base station radio module 402 and the out of band communication radio module 404 are able to boot and function independently. This means, for example, that if the base station radio module 402 fails, the out of band communication radio module 404 is still operational.

A boot sequence control module 306 is configured to initiate booting of the out of band communication module 404 first, and after the out of band communication module 404 has booted, to initiate booting of the base station radio module 402. This provides the advantage that if the base station radio module, for example, fails, its software crashes or a ROM corruption occurs, the out of band communication radio module 404 still comes up and is operational.

A security control module 408 is configured to manage remote access to the cellular network base station 400 via the out of band communication radio module 404. When a mobile communication device, for example user equipment, connects to the out of band communication radio module, the mobile communication device has to provide security credentials to the security control module 408. If the security credentials are not acceptable, the mobile communication device is not granted access to the out of band communication radio module 404. Although the security control module 408 is illustrated as a separate module, its functions may also be incorporated, for example, in the out of band communication radio module 404.

The security control module 408 includes security credentials to be used by the out of band radio communication module 404. These site specific security credentials may be supplied, for example, by a service technician connecting directly to a Local Management Port (LMP) of the LTE D2D radio module. The security credentials may then be used later to verify a mobile communication device trying to establish a D2D channel with the LTE D2D radio module. Another possibility is to configure the needed security credentials based on information received via the base station radio module 402, in other words, configure the security credentials remotely.

The separation of the base station radio module 402 and the out of band communication radio module 404 may be achieved by redesigning the hardware and software. With regard to existing cellular network base stations, it is possible configure the out of band communication module to an existing base station as an external module and make the necessary software changes in order to achieve the above described functionality. The external module may refer, for example, to user equipment, a modem, a transceiver etc.

The cellular network base station 400 may also include at least one processing unit connected to at least one memory. The at least one memory includes program code which, when executed by the at least one processing unit, causes the cellular network base station to perform the programmed functionality. It is evident that the remote manager may include hardware and software entities not disclosed in FIG. 4, for example, data communication interfaces etc.

The at least one processing unit may be configured to cause: receiving, with an out of band communication radio module of a cellular network base station, security credentials from a network element device to establish an out of band communication channel with the network element; verifying, with the out of band communication radio module, the received security credentials; and establishing, with the out of band communication radio module, the out of band communication channel with network element when the outcome of the verification is positive. The network element is, for example, a mobile communication device or a cellular network base station.

In another example, the at least one processing unit may be configured to cause: receiving, with an out of band communication radio module of an apparatus, security credentials from a remote apparatus to establish an out of band communication channel with a cellular network base station; verifying, with the out of band communication radio module, the received security credentials; and establishing, with the out of band communication radio module, the out of band communication channel with the cellular network base station when the outcome of the verification is positive.

In another example, the at least one processing unit may be configured to cause: receiving, with an out of band communication radio module of an apparatus, security credentials from a remote apparatus to establish an out of band communication channel with a cellular network base station via a mobile communication device; verifying, with the out of band communication radio module, the received security credentials; and establishing, with the out of band communication radio module, the out of band communication channel with the cellular network base station via the mobile communication device when the outcome of the verification is positive.

As a summary about the above description relating to FIG. 4, the cellular network base station 400 may refer to a cellular network base station that is used to establish an out of band communication channel to a faulty cellular network base station directly or via a mobile communication device. On the other hand, the cellular network base station 400 may refer to a faulty cellular network base station to which an out of band communication channel is established. In another example, the cellular network base station itself may be operational but a site router or switch or backhaul that connects the cellular network base station to a core network is faulty, and the cellular network base station is used to enable remote maintenance of the faulty element.

Figure 5:
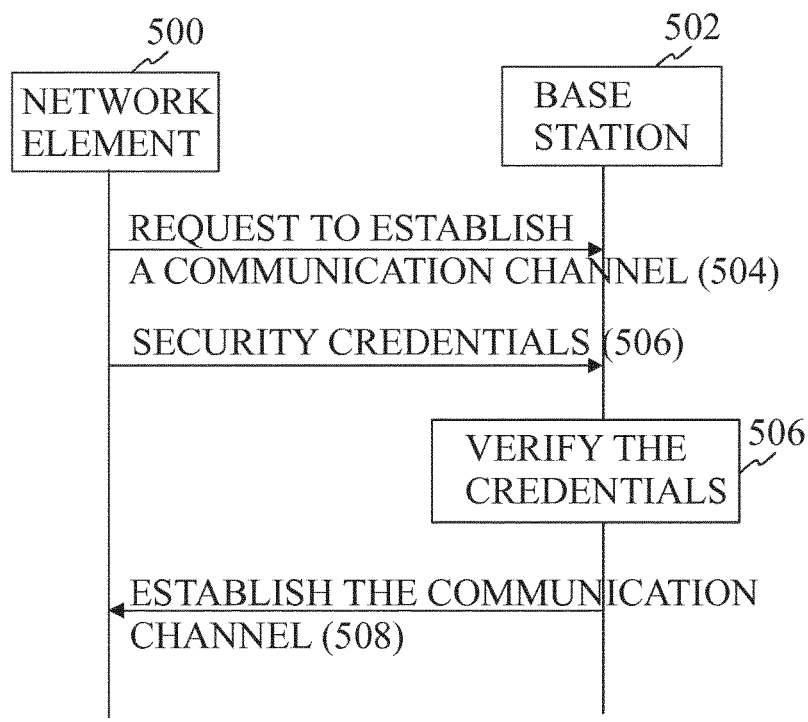
FIG. 5 is a communication flow diagram illustrating a method at a cellular network base station according to another example of the invention.

FIG. 5 is a communication flow diagram illustrating a method at a cellular network base station 502 according to another example of the invention.

At 504, a cellular network base station 502 receives a request from a network element 500, for example, user equipment or another cellular network base station to establish an out of band communication channel. The out of band communication channel refers, for example, to an LTE D2D communication channel. The cellular network base station 502 receives from the network element 500 security credentials. The mobile communication device 500 has previously received the security credentials, for example, from a remote manager as disclosed in the FIG. 2 example. A LTE D2D radio module at the cellular network base station 502 verifies (at 506) the received security credentials, and if the result of the verification is positive, the out of band communication channel, for example, the LTE D2D communication channel is established (at 508).

Via the established out of band communication channel is may be possible to access the functions of the cellular network base station 502 even if the normal remote maintenance connection cannot be used.

Figure 6:
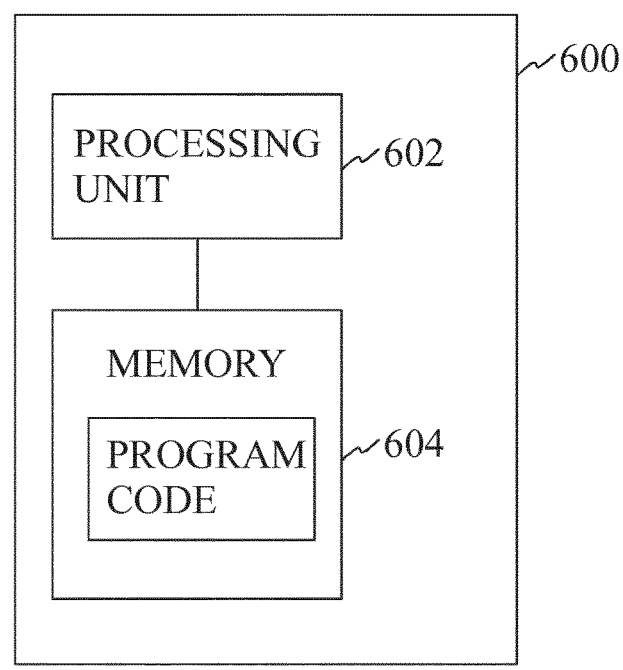
FIG. 6 is a simplified block diagram illustrating a simplified structure of a remote manager according to an example of the invention.

FIG. 6 is a simplified block diagram illustrating a simplified structure of a remote manager 600 according to an example of the invention. The remote manager 600 includes at least one processing unit 602 connected to at least one memory 604. The at least one memory 504 includes program code which, when executed by the at least one processing unit 602, causes the remote manager 600 to perform the programmed functionality. It is evident that the remote manager 600 may include hardware and software entities not disclosed in FIG. 6, for example, data communication interfaces etc. The remote manager 600 refers, for example, to an entity that provides maintenance operations in a cellular communications network.

The at least one processing unit 602 is configured to cause: detecting a failure with a first cellular network base station; and establishing an out of band communication channel with the first cellular network base station via a second cellular network base station being adjacent to the first cellular network base station.

The at least one processing unit 602 may be configured to cause: providing the second cellular network base station with security credentials to establish the out of band communication channel with the first cellular network base station; and instructing the second cellular network base station to tune-in to a specific frequency of the first cellular network base station and to supply the security credentials to the first cellular network base station to establish the out of band communication channel.

The at least one processing unit 602 may be configured to cause: establishing the out of band communication channel with the first cellular network base station via the second cellular network base station being adjacent to the first cellular network base station and a mobile communication device capable of out of band communication.

The at least one processing unit 602 may be configured to cause: selecting the mobile communication device from a set of mobile communication devices being able to communicate with the first cellular network base station and one or more cellular network base stations being adjacent to the first cellular network base station.

The at least one processing unit 602 may be configured to cause: requesting, from a location server, the set of mobile communication devices being able to communicate with the first cellular network base station and one or more cellular network base stations being adjacent to the first cellular network base station.

The at least one processing unit 602 may be configured to cause: determining, before selecting the mobile communication device, that the mobile communication device enables establishment of an out of band communication channel via the mobile communication device.

The at least one processing unit 602 may be configured to cause: determining that a parameter relating to the mobile communication device is not acceptable; and selecting a new mobile communication device to establish the out of band communication channel again.

The at least one processing unit 602 may be configured to cause: providing security credentials to be used by the mobile communication device to the second cellular network base station device when establishing the out of band communication channel.

The at least one processing unit 602 may be configured to cause: instructing the first cellular network base station and the mobile communication device to terminate the out of band communication channel and to switch back to normal operation mode.

The at least one processing unit 602 may be configured to cause: detecting the failure based on a missing status update message from the first cellular network base station.

The at least one processing unit 602 may be configured to cause: executing remote maintenance operations of the first cellular network base station via the established out of band communication channel.

Although the above examples have used LTE D2D as an example of an out of band communication technology, the disclosed solution is compatible to all types of out of band communication technologies.

Without in any way limiting the scope, interpretation, or application of the claims appearing below, a technical effect of one or more of the example embodiments disclosed herein is the ability to perform out of band troubleshooting service also for higher priority problems thus eliminating the need to send a field technician to onsite. Another technical effect of one or more of the example embodiments disclosed herein is significant reduction in the costs of solving problems of cellular network base stations which have previously needed onsite visits.

The example embodiments can include any suitable handheld devices, cellular telephones, smart phones, wireless devices, servers, workstations, and the like, capable of performing the methods of the example embodiments. The devices and subsystems of the example embodiments can communicate with each other using any suitable protocol and can be implemented using one or more programmed computer systems or devices.

Example embodiments of the present invention may be implemented in software, hardware, application logic or a combination of software, hardware and application logic. The example embodiments can store information relating to various methods described herein. This information can be stored in one or more memories, such as a hard disk, optical disk, magneto-optical disk, RAM, and the like. One or more databases can store the information used to implement the example embodiments of the present inventions. The databases can be organized using data structures (e.g., records, tables, arrays, fields, graphs, trees, lists, and the like) included in one or more memories or storage devices listed herein. The methods described with respect to the example embodiments can include appropriate data structures for storing data collected and/or generated by the methods of the devices and subsystems of the example embodiments in one or more databases.

All or a portion of the example embodiments can be conveniently implemented using one or more general purpose processors, microprocessors, digital signal processors, micro-controllers, and the like, programmed according to the teachings of the example embodiments of the present inventions, as will be appreciated by those skilled in the computer and/or software art(s). Appropriate software can be readily prepared by programmers of ordinary skill based on the teachings of the example embodiments, as will be appreciated by those skilled in the software art. In addition, the example embodiments can be implemented by the preparation of application-specific integrated circuits or by interconnecting an appropriate network of conventional component circuits, as will be appreciated by those skilled in the electrical art(s). Thus, the example embodiments are not limited to any specific combination of hardware and/or software.

Stored on any one or on a combination of computer readable media, the example embodiments of the present inventions can include software for controlling the components of the example embodiments, for driving the components of the example embodiments, for enabling the components of the example embodiments to interact with a human user, and the like. Such software can include, but is not limited to, device drivers, firmware, operating systems, development tools, applications software, and the like. Such computer readable media further can include the computer program of an example embodiment of the present inventions for performing all or a portion (if processing is distributed) of the processing performed in implementing the inventions. Computer code devices of the example embodiments of the present inventions can include any suitable interpretable or executable code mechanism, including but not limited to scripts, interpretable programs, dynamic link libraries (DLLs), Java classes and applets, complete executable programs, and the like. Moreover, parts of the processing of the example embodiments of the present inventions can be distributed for better performance, reliability, cost, and the like.

As stated above, the components of the example embodiments can include computer readable medium or memories for holding instructions programmed according to the teachings of the present inventions and for holding data structures, tables, records, and/or other data described herein. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer. A computer-readable medium may include a computer-readable storage medium that may be any media or means that can contain or store the instructions for use by or in connection with an instruction execution system, apparatus, or device, such as a computer. A computer readable medium can include any suitable medium that participates in providing instructions to a processor for execution. Such a medium can take many forms, including but not limited to, non-volatile media, volatile media, transmission media, and the like. Non-volatile media can include, for example, optical or magnetic disks, magneto-optical disks, and the like. Volatile media can include dynamic memories, and the like. Transmission media can include coaxial cables, copper wire, fiber optics, and the like. Transmission media also can take the form of acoustic, optical, electromagnetic waves, and the like, such as those generated during radio frequency (RF) communications, infrared (IR) data communications, and the like. Common forms of computer-readable media can include, for example, a floppy disk, a flexible disk, hard disk, magnetic tape, any other suitable magnetic medium, a CD-ROM, CD±R, CD±RW, DVD, DVD-RAM, DVD±RW, DVD±R, HD DVD, HD DVD-R, HD DVD-RW, HD DVD-RAM, Blu-ray Disc, any other suitable optical medium, punch cards, paper tape, optical mark sheets, any other suitable physical medium with patterns of holes or other optically recognizable indicia, a RAM, a PROM, an EPROM, a FLASH-EPROM, any other suitable memory chip or cartridge, a carrier wave or any other suitable medium from which a computer can read.

If desired, the different methods discussed herein may be performed in a different order and/or concurrently with each other. Furthermore, if desired, one or more of the above-described methods may be optional or may be combined.

Although various aspects of the invention are set out in the independent claims, other aspects of the invention include other combinations of features from the described example embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

The invention claimed is:

1. An apparatus including:
    at least one processor configured to:
    detect a failure with a first cellular network base station;
    request, from a location server, a set of mobile communication devices being able to communicate with the first cellular network base station and one or more cellular network base stations being adjacent to the first cellular network base station;
    select a mobile communication device from the set; and
    establish an out of band communication channel with the first cellular network base station via a second cellular network base station being adjacent to the first cellular network base station and the mobile communication device, to enable remote maintenance of the first cellular network base via the established out of band communication channel.

2. The apparatus according to claim 1, wherein the apparatus is further configured to:
    provide the second cellular network base station with security credentials to establish the out of band communication channel with the first cellular network base station; and
    instruct the second cellular network base station to tune-in to a specific frequency of the first cellular network base station and to supply the security credentials to the first cellular network base station to establish the out of band communication channel.

3. The apparatus according to claim 1, wherein the apparatus is further configured to:
    determine, before selecting the mobile communication device, that the mobile communication device enables establishment of an out of band communication channel via the mobile communication device.

4. The apparatus according to claim 1, wherein the apparatus is further configured to:
    determine that a parameter relating to the mobile communication device is not acceptable; and
    select a new mobile communication device to establish the out of band communication channel again.

5. The apparatus according to claim 1, wherein the apparatus is further configured to:
    provide security credentials to be used by the mobile communication device to the second cellular network base station device when establishing the out of band communication channel.

6. The apparatus according to claim 1, wherein the apparatus is further configured to:
    instruct the first cellular network base station and the mobile communication device to terminate the out of band communication channel and to switch back to normal operation mode.

7. The apparatus according to claim 1, wherein the apparatus is further configured to:
    detect the failure based on a missing message from the first cellular network base station.

8. The apparatus according to claim 1, wherein the apparatus is further configured to:
    execute remote maintenance operations of the first cellular network base station via the established out of band communication channel.

9. The apparatus according to claim 1, wherein the out of band communication includes device to device communication.

10. The apparatus according to claim 1, wherein the out of band communication includes device to device communication of long-term evolution technology.

11. A method including:
    detecting a failure with a first cellular network base station;
    requesting, from a location server, the set of mobile communication devices being able to communicate with the first cellular network base station and one or more cellular network base stations being adjacent to the first cellular network base station;
    selecting a mobile communication device from the set; and
    establishing an out of band communication channel with the first cellular network base station via a second cellular network base station being adjacent to the first cellular network base station and the mobile communication device, to enable remote maintenance of the first cellular network base via the established out of band communication channel.

12. The method according to claim 11, further including:
    providing the second cellular network base station with security credentials to establish the out of band communication channel with the first cellular network base station; and
    instructing the second cellular network base station to tune-in to a specific frequency of the first cellular network base station and to supply the security credentials to the first cellular network base station to establish the out of band communication channel.

13. The method according to claim 11, further including:
    determining, before selecting the mobile communication device, that the mobile communication device enables establishment of an out of band communication channel via the mobile communication device.

14. The method according to claim 11, further including:
determining that a parameter relating to the mobile communication device is not acceptable; and
selecting a new mobile communication device to establish the out of band communication channel again.

15. The method according to claim 11, further including:
providing security credentials to be used by the mobile communication device to the second cellular network base station device when establishing the out of band communication channel.

16. The method according to claim 11, further including:
instructing the first cellular network base station and the mobile communication device to terminate the out of band communication channel and to switch back to normal operation mode.

17. The method according to claim 11, further including:
detecting the failure based on a missing message from the first cellular network base station.

18. The method according to claim 11, further including:
executing remote maintenance operations with the first cellular network base station via the established out of band communication channel.

19. The method according to claim 11, wherein the out of band communication includes device to device communication.

20. The apparatus according to claim 11, wherein the out of band communication includes device to device communication of long-term evolution technology.

21. An apparatus including:
a base station radio module; and
an out of band communication radio module;
wherein hardware and software of the base station radio module and the out of band communication radio module are separated such that the base station radio module and the out of band communication radio module are able to boot and function independently;
a boot sequence control module configured to initiate booting of the out of band communication module first, and after the out of band communication module has booted, to initiate booting of the base station radio module; and
a security control module configured to manage remote access to the cellular network base station via the out of band communication radio module.

22. The apparatus according to claim 21, wherein
the security control module is configured to receive security credentials from a mobile communication device to establish an out of band communication channel with the mobile communication device and to verify the received security credentials; and
the out of band communication radio module is configured to establish the out of band communication channel with the mobile communication device when the outcome of the verification is positive.

23. The apparatus according to claim 21, wherein
the security control module is configured to receive security credentials from a cellular network base station to establish an out of band communication channel with cellular network base station and to verify the received security credentials; and
the out of band communication radio module is configured to establish the out of band communication channel with the cellular network base station when the outcome of the verification is positive.

24. The apparatus according to claim 21, wherein
the security control module is configured to receive security credentials from a remote apparatus to establish an out of band communication channel with a cellular network base station and to verify the received security credentials; and
the out of band communication radio module is configured to establish the out of band communication channel with the cellular network base station when the outcome of the verification is positive.

25. The apparatus according to claim 21, wherein
the security control module is configured to receive security credentials from a remote apparatus to establish an out of band communication channel with a cellular network base station via a mobile communication device and to verify the received security credentials; and
the out of band communication radio module is configured to establish the out of band communication channel with the cellular network base station via the mobile communication device when the outcome of the verification is positive.

26. The apparatus according to claim 21, wherein the out of band communication radio module includes a device to device communication radio module.

27. The apparatus according to claim 21, wherein the out of band communication radio module includes long term evolution device to device communication radio module.

28. A method including:
receiving, with an out of band communication radio module of an apparatus, security credentials from a network element to establish an out of band communication channel with the mobile communication device;
verifying, with the out of band communication radio module, the received security credentials; and
establishing, with the out of band communication radio module, the out of band communication channel with the network element when the outcome of the verification is positive.

29. The method according to claim 28, wherein the network element is a cellular network base station.

30. The method according to claim 28, wherein the network element is a mobile communication device.

* * * * *